(12) United States Patent
Bacon

(10) Patent No.: US 9,682,735 B2
(45) Date of Patent: Jun. 20, 2017

(54) FUEL EFFICIENCY OF ROAD VEHICLES

(71) Applicant: Andrew Bacon, Sandy (GB)

(72) Inventor: Andrew Bacon, Sandy (GB)

( * ) Notice: Subject to any disclaimer, the term of this patent is extended or adjusted under 35 U.S.C. 154(b) by 0 days.

(21) Appl. No.: 14/775,001

(22) PCT Filed: Mar. 12, 2014

(86) PCT No.: PCT/GB2014/050743
§ 371 (c)(1),
(2) Date: Sep. 11, 2015

(87) PCT Pub. No.: WO2014/140576
PCT Pub. Date: Sep. 18, 2014

(65) Prior Publication Data
US 2016/0016616 A1    Jan. 21, 2016

(30) Foreign Application Priority Data

| Mar. 13, 2013 | (GB) | 1304476.3 |
| Apr. 5, 2013 | (GB) | 1306157.7 |
| Apr. 5, 2013 | (GB) | 1306219.5 |

(51) Int. Cl.
B62D 35/00        (2006.01)

(52) U.S. Cl.
CPC .................. B62D 35/001 (2013.01)

(58) Field of Classification Search
CPC .................................................. B62D 35/001
USPC ...................................................... 296/180.4
See application file for complete search history.

(56) References Cited

U.S. PATENT DOCUMENTS

| 2,800,291 A | 7/1957 | Stephens |
| 4,343,506 A | 8/1982 | Saltzman |
| 4,813,633 A * | 3/1989 | Werle ................... B63H 9/0607 244/130 |

(Continued)

FOREIGN PATENT DOCUMENTS

| EP | D654397 A1 | 5/1995 |
| EP | 2572967 A2 | 3/2013 |

(Continued)

OTHER PUBLICATIONS

International Search Report issued in corresponding application No. PCT/GB2014/050743 mailed Jul. 3, 2014 (2 pages).

(Continued)

*Primary Examiner* — Joseph D Pape
(74) *Attorney, Agent, or Firm* — Osha Liang LLP

(57) ABSTRACT

An aerodynamic unit is attached onto a roof of a road vehicle so that air passes over the unit during forward movement of the road vehicle. The unit has a first end for positioning distal to a rear end of a vehicle roof and a second end for positioning proximal a rear end of a vehicle roof. The unit includes an inclined guide portion which decreases in height in a direction towards the trailing end of the unit. The unit also includes a flow director, which directs air flow to the guide portion, disposed at or near the leading end of the aerodynamic unit. The flow director has a height increasing in a direction from the leading end towards the trailing end. The unit may include vortex generators protruding from the guide portion. A fin may extend along each side of the unit in a direction between the trailing end and the leading end.

19 Claims, 16 Drawing Sheets

(56) References Cited

U.S. PATENT DOCUMENTS

| | | | |
|---|---|---|---|
| 5,522,637 A | 6/1996 | Spears | |
| 7,192,077 B1 | 3/2007 | Hilleman | |
| 2006/0232102 A1 | 10/2006 | Steel et al. | |
| 2007/0235590 A1 | 10/2007 | Kokoshkin et al. | |
| 2007/0246969 A1 | 10/2007 | Smith et al. | |
| 2011/0175395 A1 | 7/2011 | Guigne et al. | |
| 2011/0272964 A1 | 11/2011 | Henderson et al. | |
| 2012/0261946 A1 | 10/2012 | Steel | |
| 2012/0292945 A1 | 11/2012 | Nusbaum | |
| 2013/0076063 A1 | 3/2013 | Ryan et al. | |
| 2013/0076064 A1 | 3/2013 | Smith et al. | |

FOREIGN PATENT DOCUMENTS

| | | | |
|---|---|---|---|
| EP | 2771231 A1 | 9/2014 | |
| FR | 2366980 A1 | 5/1978 | |
| GB | 2271323 A | 4/1994 | |
| GB | 2443035 A | 4/2008 | |
| GB | 2511871 A | 9/2014 | |
| JP | H06156326 A | 6/1994 | |
| JP | 2000033886 A | 2/2000 | |
| KR | 20100061257 A | 6/2010 | |
| NZ | 565720 A | 10/2010 | |
| WO | 9009303 A1 | 8/1990 | |
| WO | 2013063479 A1 | 5/2013 | |
| WO | 2014035299 A1 | 3/2014 | |

OTHER PUBLICATIONS

International Search Report issued in PCT/GB2014/051083 mailed on Oct. 9, 2014 (5 pages).

Written Opinion of the International Searching Authority issued in PCT/GB2014/051083 mailed on Oct. 9, 2014 (9 pages).

Combined Search and Examination Report issued in British Application No. GB1605766.3; Dated Aug. 31, 2016 (6 pages).

* cited by examiner

FUEL EFFICIENCY OF ROAD VEHICLES

FIELD OF THE INVENTION

The present invention relates to road vehicles, more particularly, but not exclusively, to road haulage vehicles, buses and cars of the "people carrier" type.

BACKGROUND OF THE INVENTION

It is known that improvements in vehicle performance and fuel consumption can be achieved through improvements in the aerodynamic structure of a vehicle. Such improvements are sought in the design of vehicles in the haulage industry, for example articulated vehicles of the kind having a cab and trailer.

One method of improving the aerodynamic structure of a trailer of a haulage vehicle is to modify the roof of the trailer so that it defines a recess having a surface inclined downwardly below the level of the roof at the rear of the trailer, see for example the trailer shown in GB2271323. However, the incorporation of such a recess can be complex and costly.

SUMMARY OF THE INVENTION

An aim of the present invention is to alleviate one or more problems associated with road vehicles of the prior art.

A first aspect of the invention provides an aerodynamic unit for a road vehicle, wherein the aerodynamic unit is configured for attachment onto a roof of a road vehicle so that air passes over the aerodynamic unit during forward movement of the road vehicle, wherein the aerodynamic unit has a first or leading end for positioning distal to a rear end of a vehicle roof, and a second or trailing end for positioning proximal a rear end of a vehicle roof, further wherein the aerodynamic unit comprises a guide portion which decreases in height in a direction towards the trailing end of the unit.

In use, i.e. as the vehicle is travelling forwards, the roof moves through the air and air is directed over the unit from the leading end to the trailing end. It is understood that the configuration of the guide portion serves to guide the air towards the trailing end (and away from the vehicle) in a generally downwards direction with respect to the roof of the vehicle, and that this has the effect of reducing turbulence at a rear of a road vehicle and improving aerodynamic efficiency of the vehicle, reducing drag effects and improving fuel efficiency.

The provision of an aerodynamic unit that is attachable to a road vehicle means that road vehicles can be modified for improved aerodynamic efficiency at the point of manufacture with increased ease and reduced costs than methods of the prior art. Furthermore, the aerodynamic unit can also be readily used to modify many existing road vehicles for improved aerodynamic efficiency.

The aerodynamic unit may be dimensioned to extend substantially across the width of a roof of a road vehicle. Width is measured from one side of a vehicle to the other side of a vehicle, that is to say, in a direction transverse to the rear to front direction. For example, the aerodynamic unit may extend from a position parallel to one side of the road vehicle to a position parallel to the other side of the road vehicle, or the aerodynamic unit may extend between side protrusions of a roof of a road vehicle, or the aerodynamic unit may be positioned between (e.g. spaced slightly from) the sides of the road vehicle.

The guide portion may define an inclined surface, e.g. at constant gradient or a planar surface. Alternatively, the guide portion may define a curved surface, for example of a convex or concave surface.

The aerodynamic unit may comprise a planar section at or near the leading end. The planar section may be dimensioned to have a height substantially equal to that of the end of the guide portion nearest the leading end. The planar section may be a cuboid of a substantially square or rectangular cross section. The planar section has been found to contribute to improving the aerodynamic efficiency of a road vehicle.

The aerodynamic unit may comprise a flow director at or near the leading end of the aerodynamic unit for directing air flow to the guide portion. The flow director may be configured to have a height increasing in a direction from the leading end towards the trailing end. The combination of the flow director and guide portion further increases aerodynamic efficiency because the flow director promotes laminar flow to the guide portion.

In use, the aerodynamic unit is attached to a roof of a road vehicle, for example the roof of a trailer, as such the aerodynamic unit increases the overall height of the road vehicle at the position of attachment. Increasing the height of a road vehicle would generally be considered to reduce the aerodynamic efficiency of a road vehicle. However, surprisingly, the present inventor has found that the aerodynamic benefit gained from use of the aerodynamic unit, in particular when the aerodynamic unit comprises a flow director, outweighs the aerodynamic loss encountered from increasing the height of a road vehicle.

The flow director may define an inclined planar surface, i.e. when viewed from the side or in cross-section. Alternatively, the flow director may define a curved surface, i.e. when viewed from the side or in cross-section. For example, the curved surface may be a convex curved surface. In an exemplary embodiment, the convex curve may have a radius that increases from a minimum at an end nearest the leading end to a maximum at an end nearest the trailing end. This particular shape of flow director has been found to be particularly effective at improving the aerodynamic efficiency of a road vehicle.

The aerodynamic unit may comprise one or more vortex generators protruding from the tapered section for, in use, directing air from the trailing end at an angle to a roof of a road vehicle. The vortex generators, in use when a road vehicle is travelling in a forwards direction, create vortices that maintain a flow of air off the trailing end in substantial alignment with an inclined or curved surface of the tapered section, which contributes to improving the efficiency of a road vehicle having the aerodynamic unit attached.

Each vortex generator may have a substantially constant height profile, such that the vortex generators protrude more from the tapered section towards the trailing end than towards the leading end. The vortex generators may be profiled to have a height profile that extends substantially parallel to a portion of a base of the aerodynamic unit. The vortex generators may be profiled to have a height profile that extends substantially parallel to a roof of a vehicle when attached thereto. Alternatively, the vortex generator may slope downwards from the leading end to the trailing end, so as to be angled to a portion of a base of the aerodynamic unit and/or a roof of a vehicle.

Each vortex generator may comprise a neck and a wider region arranged so as to be capable of, in use, producing two vortices. The wider region may define a hollow region between two side walls that define the wider region. Alternatively, the wider region may define a solid region between two side walls that define the wider region. The vortex generators may be positioned so as to form a channel between adjacent vortex generators. The channel may have a narrow neck extending to a wider body. For example, the channel may be considered to have a wishbone shape.

The aerodynamic unit may comprise a fin for directing air flow to a central region of the aerodynamic unit, for example to direct flow over the guide portion, and in some embodiments the flow director and/or planar section. The fin may extend in a direction between the trailing end and the leading end and be positioned along a side of the aerodynamic unit. For example, two side fins may be provided and may extend along opposing sides of the aerodynamic unit, e.g. one on either side of the aerodynamic unit.

The fin(s) may extend to the leading end and define a region for directing air flow to a central region of the aerodynamic unit before flowing over the flow director, the planar section and/or the guide portion. When the aerodynamic unit comprises a flow director, the fin(s) may extend along the flow director and extend therefrom in a direction away from the leading end (e.g. towards the front of a road vehicle), so as to form a region for directing air flow to a central region of the aerodynamic unit before flowing over the flow director. Forming such a region has been found to further improve aerodynamic efficiency. The fins may be configured to project at least substantially along the length of the vehicle roof, so that the leading end of the fins is at or adjacent the front end of vehicle (e.g. a haulage trailer).

Each fin may comprise a planar face that faces inwardly towards a central region of the aerodynamic unit so as to promote laminar flow and direct air flow to within the central region of the aerodynamic unit.

Each fin may comprise a curved surface that faces outwardly from the aerodynamic unit for, in use during forward driving conditions, reducing turbulence from side winds.

The guide portion may have a maximum height that extends a distance that is one fifth of its length or less.

The aerodynamic unit may be formed as a single unit. Forming the unit as a single unit can ease attachment of the aerodynamic unit to a road vehicle because there is no need to align multiple individual components on the roof of a road vehicle. Alternatively, the aerodynamic unit may be formed in two or more parts. For example, the aerodynamic unit may be formed in two parts, e.g. a leading part and a trailing part. The leading part may include, by way of example only, a flow director, optionally a planar section, and a portion of one or two fins. The trailing part may include the guide portion, a portion of one or two fins, and optionally one or more vortex generators.

The aerodynamic unit may comprise two fins attachable to a roof of a vehicle, for example substantially in line with two sides of a vehicle. The guide portion and optionally the planar portion and/or the flow director may extend between the two fins at a positioned spaced from a base of the fins, such that in use the guide portion and optionally the planar portion and/or the flow director are spaced from a roof of a road vehicle. An underside of the guide portion, planar portion and/or flow director may have a curved profile. For example, a portion of the aerodynamic unit between the fins may have a profile of an aerofoil. The aerodynamic unit may comprise a lip at a trailing end that is angled to the guide portion, e.g. at an acute or obtuse angle.

The aerodynamic unit may comprise an air flow guide spaced from the guide portion on a side of the upper surface of the guide portion. The aerodynamic unit may include a gap between the air flow guide and the guide portion that extends from one side of the air flow guide portion to another side of the guide flow portion, said sides being sides tangential to the leading and trailing ends of the aerodynamic unit. The aerodynamic unit may comprise two supports that define a position of the air flow guide. The air flow guide may extend between the two supports. The two supports may extend and be positioned so as to be substantially alignable with two sides of a road vehicle. The air flow guide may have an aerofoil shape. The air flow guide may comprise a lip positioned at a trailing end of the air flow guide. The lip may be angled to an adjacent portion of the air flow guide.

A second aspect of the invention provides an aerodynamic unit for attachment to a road vehicle, e.g. of the type comprising a cab and trailer, to improve fuel efficiency, the unit comprising: two side fins for attachment to a roof of a road vehicle; and an air flow guide extending between said two fins, such that said two fins define the position of the air flow guide relative to a roof of a road vehicle when the aerodynamic unit is attached thereto.

The air flow guide may have an aerofoil shape. Alternatively, the air flow guide may have a planar upper and lower surface. The air flow guide may have a curved or angled upper and/or lower surface.

The air flow guide may be spaced from a base of the two fins, such that in use the air flow guide is spaced from a roof of a road vehicle. An underside of the air flow guide may have a curved profile. The aerodynamic unit may comprise a lip at a trailing end that is angled to an adjacent portion of the trailing end, e.g. at an acute or obtuse angle. A trailing end of the lip may be positioned to be substantially alignable with a rear side of a road vehicle.

The fins may each have an inner face that is substantially planar across all or the majority of the face. The fins may each have an outer face that is curved or substantially planar across all or the majority of the face.

The aerodynamic unit of the second aspect may have any one of, or any combination of, features of the aerodynamic unit of the first aspect.

A further aspect of the invention provides a road vehicle having the aerodynamic unit according to the first aspect or second aspect.

The road vehicle may comprise a cab and a trailer (e.g. as separate 'tractor' and 'trailer' units, or as a single unit). The trailer may have a front end positioned at a greater height than a rear end, i.e. the trailer may be run with rake.

The aerodynamic unit may be positioned on a roof of the road vehicle such that an end of the aerodynamic unit is substantially aligned with a rear side of the road vehicle.

A yet further aspect of the invention provides a method of modifying a road vehicle to improve the road efficiency thereof, the method comprising: attaching an aerodynamic unit according to the first aspect to a roof of the road vehicle in a region towards the rear of the road vehicle.

The aerodynamic unit may be attached to the roof using, for example, fasteners, e.g. bolts.

According to a still further aspect of the invention, there is provided a road vehicle comprising a cab and trailer, wherein the trailer has a roof, and wherein a first aerodynamic fin projects from the roof of the trailer and extends at least substantially between the front and rear ends of the trailer along or proximal one edge of the trailer roof, and a second aerodynamic fin projects from the roof of the trailer and extends at least substantially between the front and rear ends of the trailer along or proximal an opposing edge of the trailer roof, wherein the fins define a channel therebetween.

Each fin may comprise a planar face extending upwards from the roof of the trailer (e.g. orthogonal to the roof of the trailer) and facing inwardly of the channel.

Each fin may comprise a curved surface that faces outwardly of the channel.

A fin may have a sloped, curved or otherwise tapered leading end.

Each fin may comprise a planar upper surface (e.g. extending parallel to roof of the trailer).

The cab and a trailer may comprise separate 'tractor' and 'trailer' units, or comprise a single unit.

In exemplary embodiments, the trailer roof defines a planar upper surface which is generally horizontal (e.g. intended to be at least generally parallel with the road surface on which the vehicle is travelling). In other embodiments, the trailer roof is curved downwards or defines a downward incline towards the rear of the trailer.

In exemplary embodiments, the sides and roof of the trailer define a right angle and each fin is a single unit which mounted on the roof of the trailer.

In a yet further aspect of the invention there is provided a road haulage vehicle having a cab and trailer, wherein an aerodynamic unit is mounted on the roof of the trailer, the aerodynamic unit comprising an air flow guide having a leading end and a trailing end, and an upper surface which is curved or angled downwards between the leading end and the trailing end, further wherein the air flow guide includes a lip which extends upwardly at said trailing end, and wherein a distal end of the lip is at least generally aligned with the a rear face of the trailer.

The air flow guide may be arranged between opposing fins. The fins may extend substantially parallel with opposing side faces of the trailer. The air flow guide may be supported by the fins, such that an underside of the airflow body is spaced from the roof of the trailer.

The airflow guide may have a curved underside.

The cab and trailer may comprise separate wheeled units.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
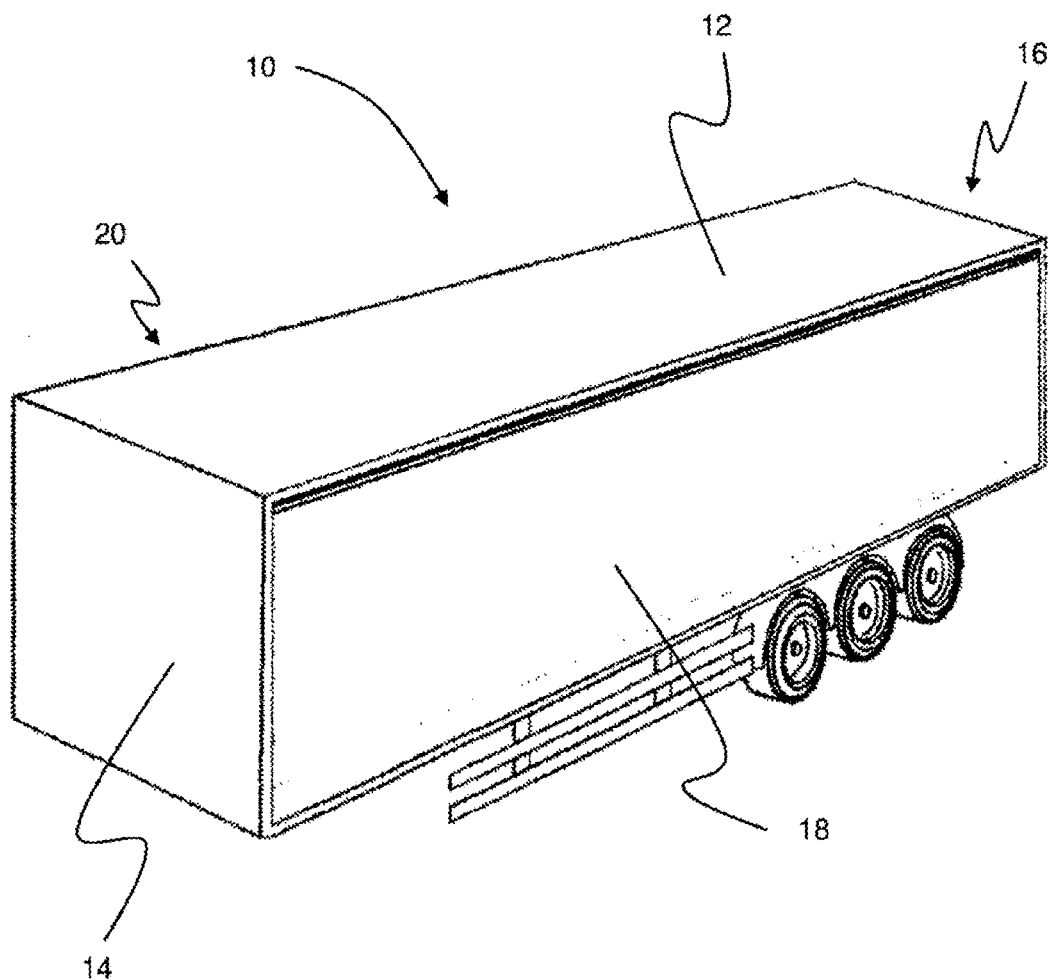
FIG. 1 shows a perspective view of a trailer of the prior art.

Referring to FIG. 1, a conventional trailer is indicated generally at 10. The trailer 10 is of a box type and includes a roof 12, a front wall 14, a rear wall 16, and two side walls 18 and 20. As will now be described, the invention provides an aerodynamic unit that can be attached to a conventional trailer (e.g. a trailer with substantially square corners), or alternatively an unconventional trailer (e.g. with radius corners) where appropriate, to improve the aerodynamic properties of the trailer.

Figure 2:
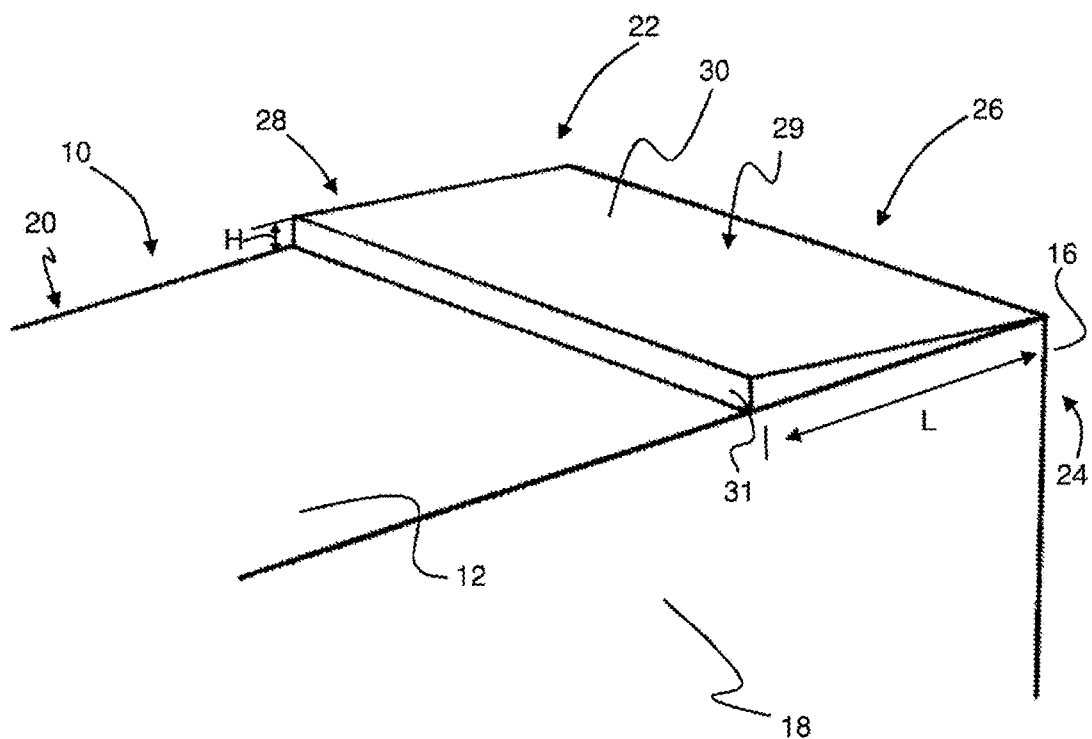
FIGS. 2 to 9 show a perspective view of a rear portion of the trailer of FIG. 1 with an aerodynamic unit attached thereto, each figure shows an alternative aerodynamic unit attached.

FIG. 2 shows a rear portion of the trailer unit 10, modified for improved aerodynamic properties and therefore improved fuel economy. An aerodynamic unit 22 is positioned on the roof 12 proximal to the rear 24 of the trailer unit 10, i.e. near the rear wall 16, and in this embodiment is adjacent the rear wall 16. In alternative embodiments, the aerodynamic unit 22 may be spaced inwardly from the rear end of the trailer 10. However, it is preferable from an aerodynamic efficiency point of view that there is substantially no space between the aerodynamic unit and the edge of the roof that is aligned with the rear side 16 of the trailer. In a further alternative embodiment the trailing end of the aerodynamic unit may overhang the trailer. However, it is preferable from a practical point of view with regard to damage limitation when parking at loading bays, that the aerodynamic unit does not overhang the trailer.

In the present embodiment, the aerodynamic unit 22 is connected to the roof 12 using bolts, but any suitable attachment method may be used.

The aerodynamic unit 22 includes a trailing end 26 proximal to the rear 24 of the trailer unit 10 and a leading end 28 distal to the rear 24 of the trailer unit 10. In the present embodiment, the aerodynamic unit 22 is generally wedge shaped. The wedge shape defines a tapered section 29 (the guide portion) that tapers from the leading end 28 to the trailing end 26 of the aerodynamic unit 22. The tapered section 29 is dimensioned so as to extend the width of the trailer unit 10 between the sides 18, 20 of the trailer unit.

The tapered section 29 defines a planar surface 30 that is inclined to the roof of the trailer, so as to have a maximum height at the leading end and a minimum height at the trailing end. In alternative embodiments, the tapered section 29 may define a curved surface, e.g. a surface having a concave or convex profile. An end face 31 of the wedge shaped aerodynamic unit forms a step change in height from the roof 12 of the trailer unit 10 to the planar surface 30. The end face 31 is substantially right angled to an underside of the tapered section 29 (not visible) which abuts against and is substantially parallel to the roof 12 of the trailer unit 10. In the present embodiment, the tapered section has a length L that is at least five times its height H, for example the length L is approximately nine times the height H. In the presently described embodiment the height H is 125 mm, but any other suitable height may be used.

In use, the tapered section of the presently described invention directs air flow from the rear end of the trailer unit 10 at an angle which reduces turbulence when the air flow is introduced into the slower surrounding air with respect to the movement of the vehicle, and therefore reduces drag. Drag reduction results in reduced fuel consumption.

Advantageously, the aerodynamic unit 22 is built as a separate unit that is mountable to a trailer 18. This means that standard and non-standard trailers can be modified for improved aerodynamic efficiency. Further, attachment of the aerodynamic unit 22 means that modifying a trailer at the point of manufacture is also eased and costs reduced compared to aerodynamically modified trailers of the prior art.

Figure 3:
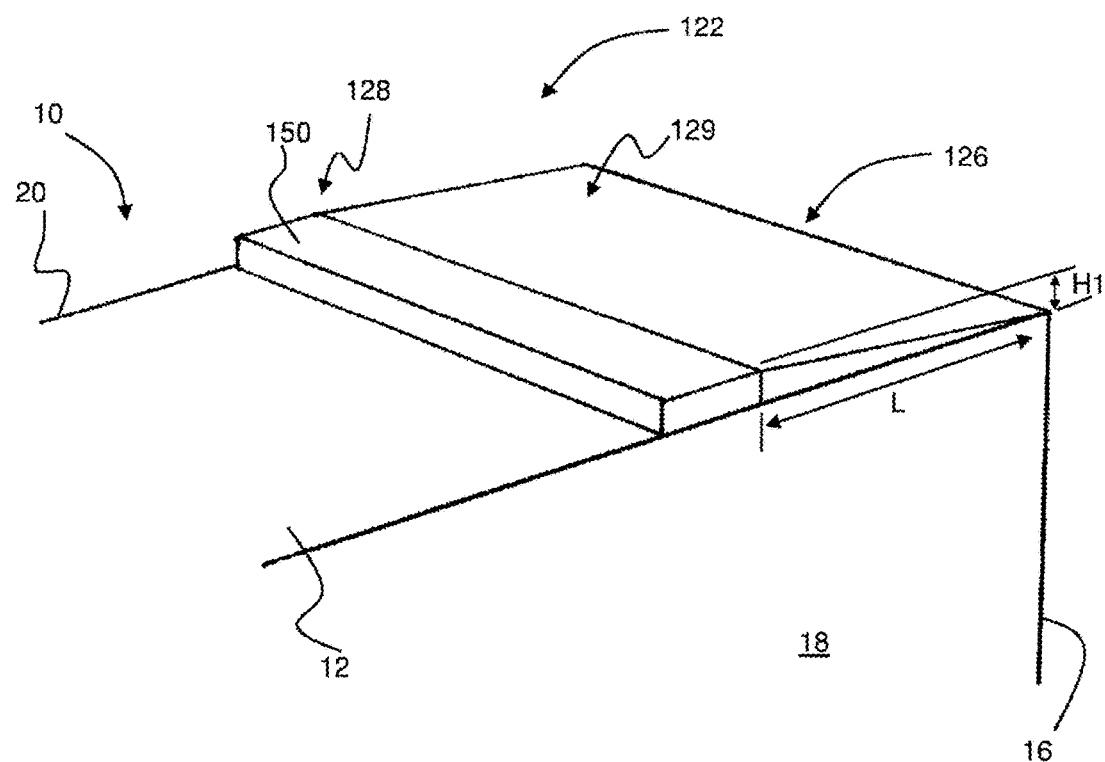

An alternative aerodynamic unit 122 is shown in FIG. 3. Only the main differences between the embodiment of FIG. 2 and FIG. 3 will be described, and similar features are given similar reference numerals but with a prefix "1".

The aerodynamic unit 122 includes, in addition to a tapered section 129 positioned proximal to the rear of the trailer, a planar section 150 positioned distal to the rear of the trailer and adjacent the tapered section. In the present embodiment, the aerodynamic unit is formed as a single component (e.g. by casting or moulding), but alternatively, the tapered section 129 and the planar section 150 may be formed as separate components, for example formed separately as a front (or leading end) and a rear (or trailing end) component.

The planar section 150 is a cuboid having a rectangular cross section. The planar section 150 is dimensioned to extend the width of the trailer unit 10 between the sides 18, 20 of the trailer unit. The height of the planar section 150 is substantially equal to the maximum height H1 of the tapered section 129. In an alternative embodiment, the planar section may be a cuboid having a square cross section.

Figure 4:
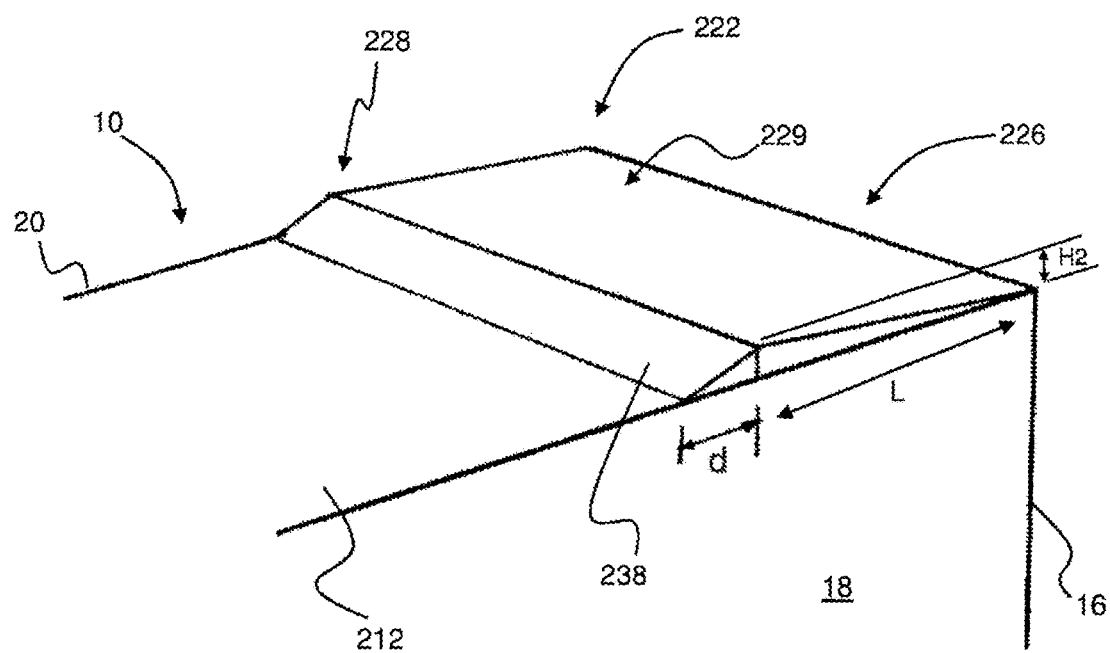

A further alternative embodiment of an aerodynamic unit 222 is shown in FIG. 4, only the main differences between the embodiment of FIG. 3 and FIG. 4 will be described, and similar features are given similar reference numerals but with a prefix "2".

In the embodiment of FIG. 4, a flow director 238 is provided instead of the planar section 150 of the aerodynamic unit 122 of FIG. 3. The flow director 238 is positioned adjacent the tapered section 229, at an end proximal the leading end of the aerodynamic unit.

The flow director 238 has a reverse taper such that it has a minimum height at the leading end of the aerodynamic unit, and a maximum height towards the trailing end of the aerodynamic unit. The maximum height of the flow director 238 is dimensioned to be substantially equal to the maximum height H2 of the tapered section 229. The flow director 238 is dimensioned to extend the width of the trailer unit 10 between the sides 18, 20 of the trailer unit. In the present embodiment, the flow director 238 has a length d that is approximately twice the height H2. The flow director 238 defines an inclined planar surface from the roof of the trailer unit to the tapered section. However, as illustrated in later embodiments, the flow director may define a curved surface, for example a concave or convex surface.

The addition of the flow director to the aerodynamic unit has been found to further improve the aerodynamic efficiency of the trailer, by promoting laminar flow to the tapered section.

Figure 5:
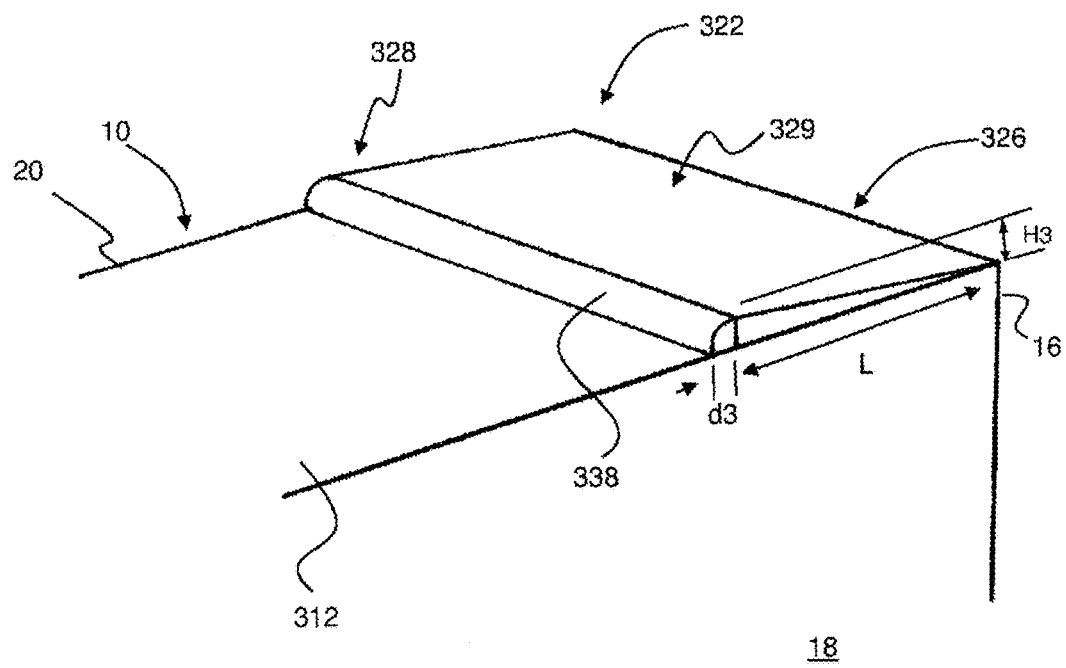

A yet further embodiment of an aerodynamic unit 322 is shown in FIG. 5. Only the main differences between the embodiment of FIG. 4 and FIG. 5 will be described, and similar features are given similar reference numerals, but with a prefix "3".

The aerodynamic unit 322 of FIG. 5 includes a tapered section 329 and a flow director 328. However, the flow director 328 of the embodiment of FIG. 5 defines a convex curved surface instead of an inclined planar surface. The convex surface defined by the flow director has a length d3 substantially equal to the maximum height H3 of the flow director. In alternative embodiments, the length d3 may extend a longer distance than the height H3.

Figure 6:
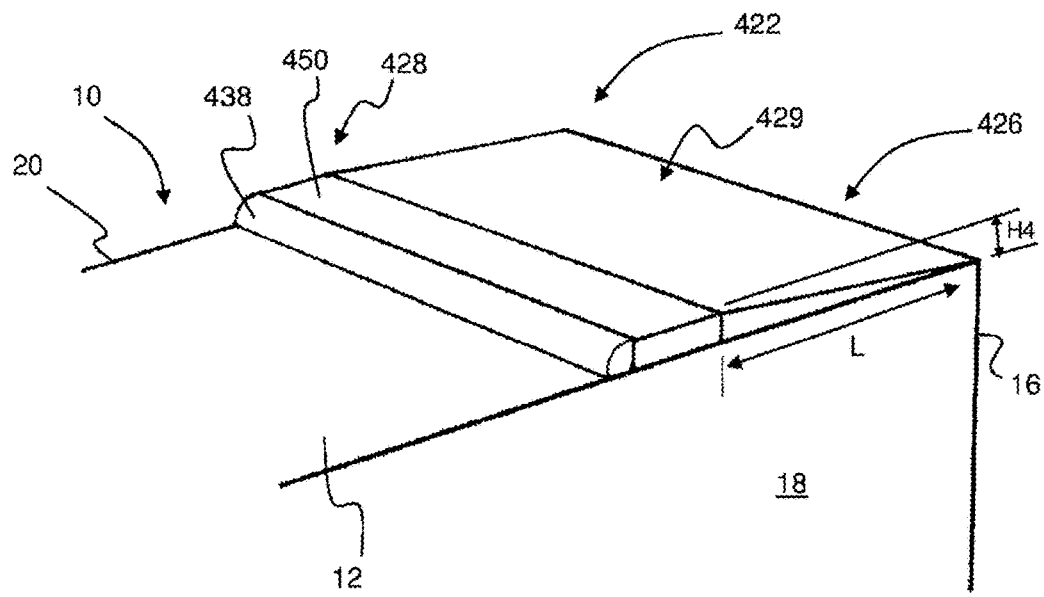

An alternative embodiment is shown in FIG. 6. Only the main differences between the embodiment of FIG. 5 and FIG. 6 will be described, and similar features are given similar reference numerals, but with a prefix "4".

The aerodynamic unit 422 shown in FIG. 6, includes a tapered section 429, a planar section 450 adjacent the tapered section 429 and a flow director 438 adjacent the planar section 450.

In the present embodiment, the tapered section 429 is similar to that shown in FIGS. 2 to 5, the planar section 450 is similar to that shown in FIG. 3, and the flow director 438 is similar to the flow director shown in FIG. 5. The maximum height of the flow director 438 and the planar section 450 is substantially equal to the maximum height H4 of the tapered section 429. In alternative embodiments, the flow director may be similar to the flow director of FIG. 4.

Figure 7:
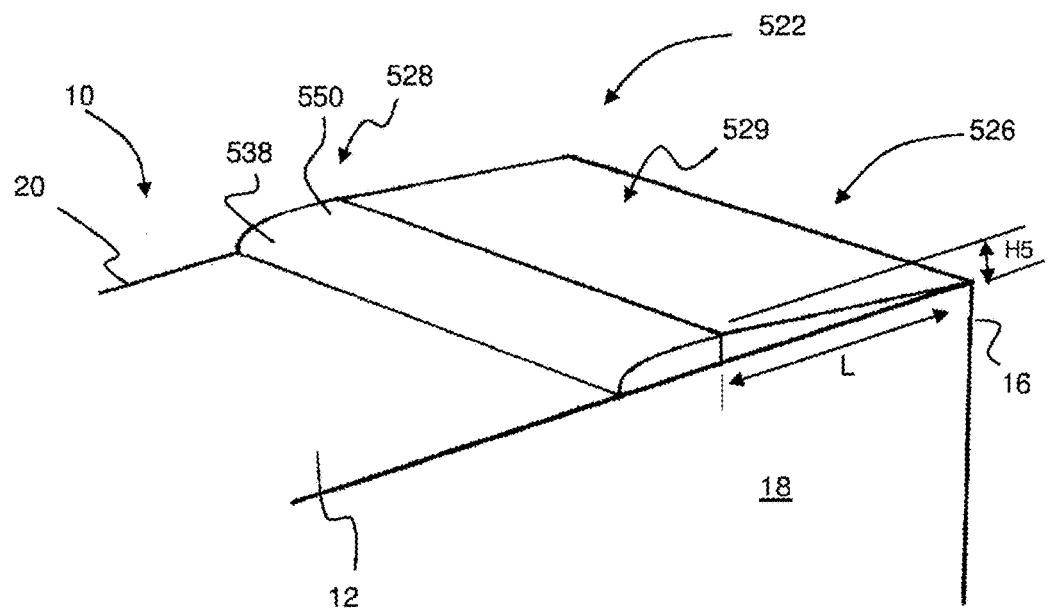

Another alternative embodiment is shown in FIG. 7. Only the main differences between the embodiment of FIG. 6 and FIG. 7 will be described, and similar features are given similar reference numerals, but with a prefix "5".

The aerodynamic unit 538 of FIG. 7 includes a tapered section 529, a planar section 550 adjacent the tapered section 529 and a flow director 538 adjacent the planar section 550.

The flow director 538 has a curved profile that creates a convex curve. The convex curve has a radius that increases from the leading end of the aerodynamic unit towards the trailing end of the aerodynamic unit. The increase in radius smoothes the transition from the flow director 538, to planar section 550 and the tapered section 529.

The smooth transition has been found to further improve aerodynamic efficiency of a trailer 10.

Figure 8:
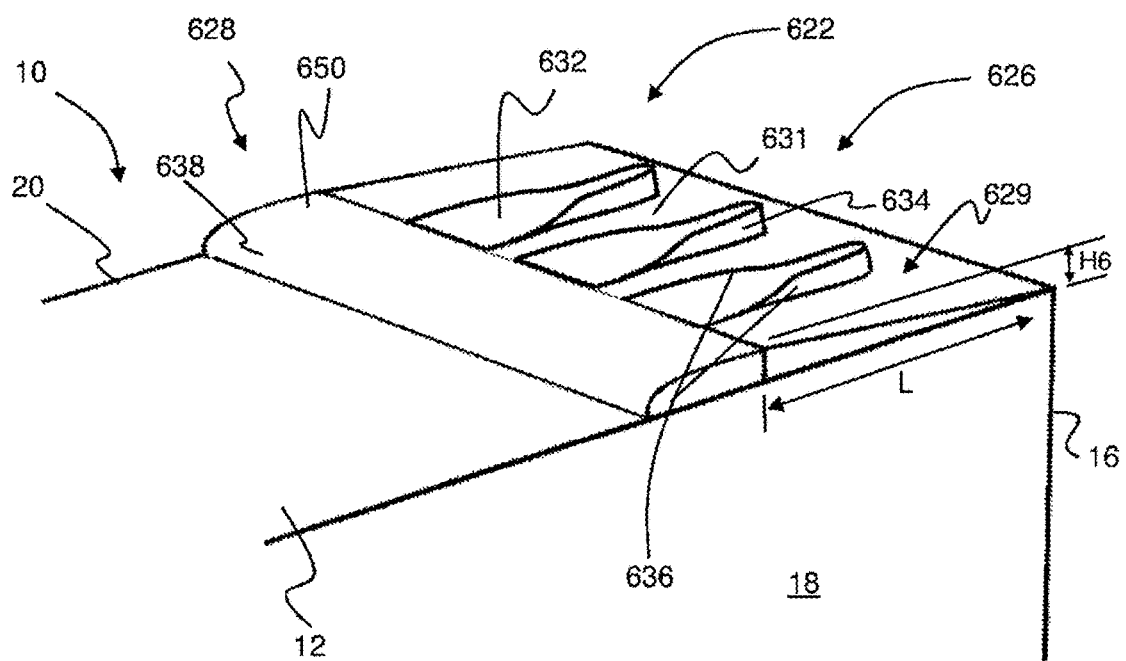

A further alternative embodiment is shown in FIG. 8. Only the main differences between the embodiment of FIG. 7 and FIG. 8 will be described, and similar features are given similar reference numerals, but with a prefix "6".

The aerodynamic unit 622 of FIG. 8 is similar to the aerodynamic unit 522 of FIG. 7 in that it includes a similar flow director 638 adjacent a planar section 650, which is adjacent a tapered section 629. The aerodynamic unit 622 differs from the aerodynamic unit shown in FIG. 8, in that it includes a plurality of vortex generators 632 (only one labelled for clarity) protruding (from the tapered section 629). In the present embodiment three vortex generators 632 are provided In the present embodiment, each vortex generator 632 is shaped to form a channel 631 between adjacent vortex generators 632. The channel 631 has a wishbone shape, such that the channel extends from a narrow neck towards the leading end of the aerodynamic unit, to a wider body towards the trailing end of the aerodynamic unit. Each vortex generator 632 has a neck portion 634 towards the trailing end that extends to two arms 636 towards the leading end and the region between the two arms 636 is substantially solid. In alternative embodiments, the region between the two arms 636 may be substantially hollow. The height of the vortex generator 632 is substantially constant with respect to the trailer roof along the length of the aerodynamic unit (e.g. to be parallel with the underside of the unit 622), which results in the vortex generator 632 protruding from the tapered section 629 to a greater extent near the rear 24 of the trailer 10 than in a region near the leading end 628 of the aerodynamic unit 622. Alternatively, the vortex generator 632 may slope downwards from the leading end to the trailing end, so as to be angled to a portion of a base of the aerodynamic unit and/or a roof of a vehicle.

The vortex generators have been found to improve aerodynamic efficiency of the trailer. The vortex generators 632 generate vortices that maintain air flow in substantial alignment with surface 630 of the tapered section 621 when flowing away from the trailing end. In the present embodiment, each vortex generator generates two vortices. The provision of the vortex generators 632 further reduces drag, and therefore improves fuel efficiency of a vehicle having the trailer 10 attached thereto.

Vortex generators of the kind described herein may be incorporated in any of the previously described embodiments.

A yet further alternative embodiment is shown in FIGS. 9 to 13. Only the main differences between the embodiment of FIG. 8 and FIGS. 9 to 13 will be described, and similar features are given similar reference numerals, but with a prefix "7".

Figure 9:
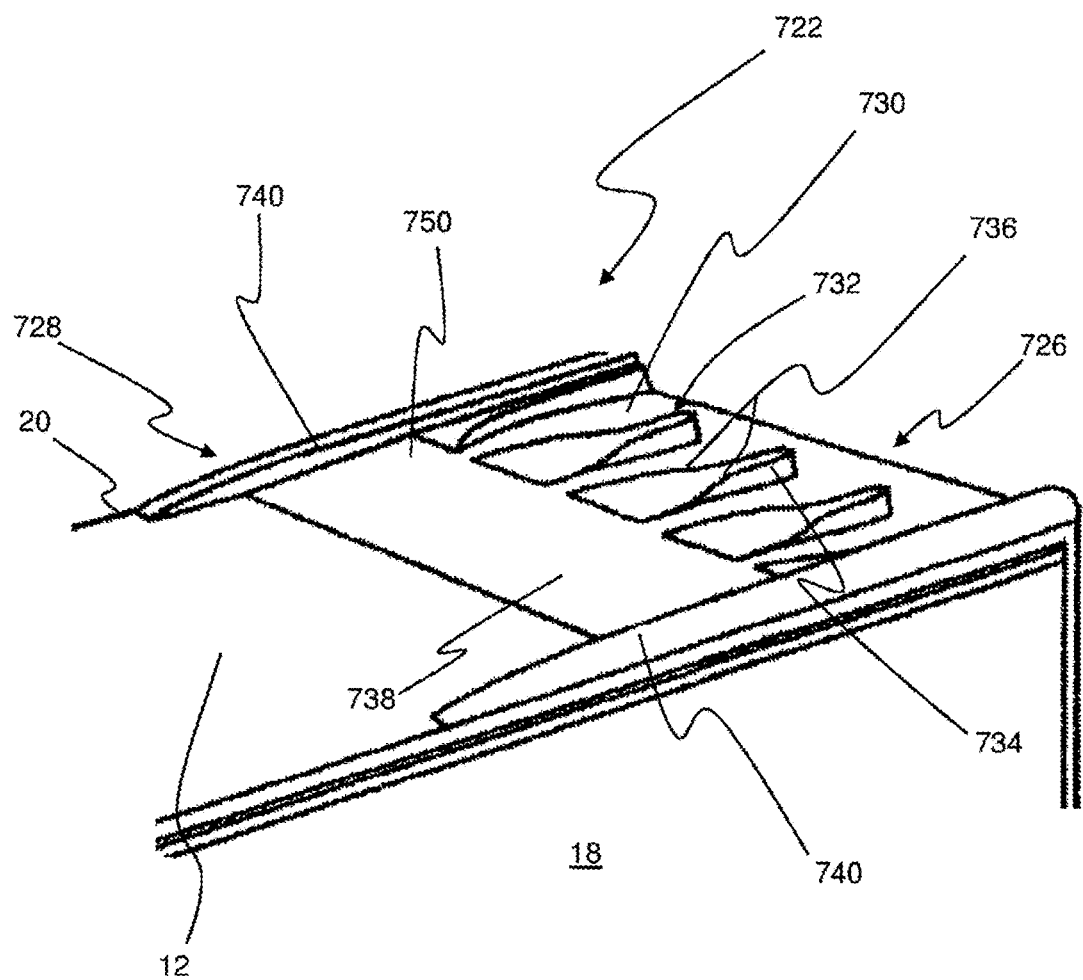
Figure 10:
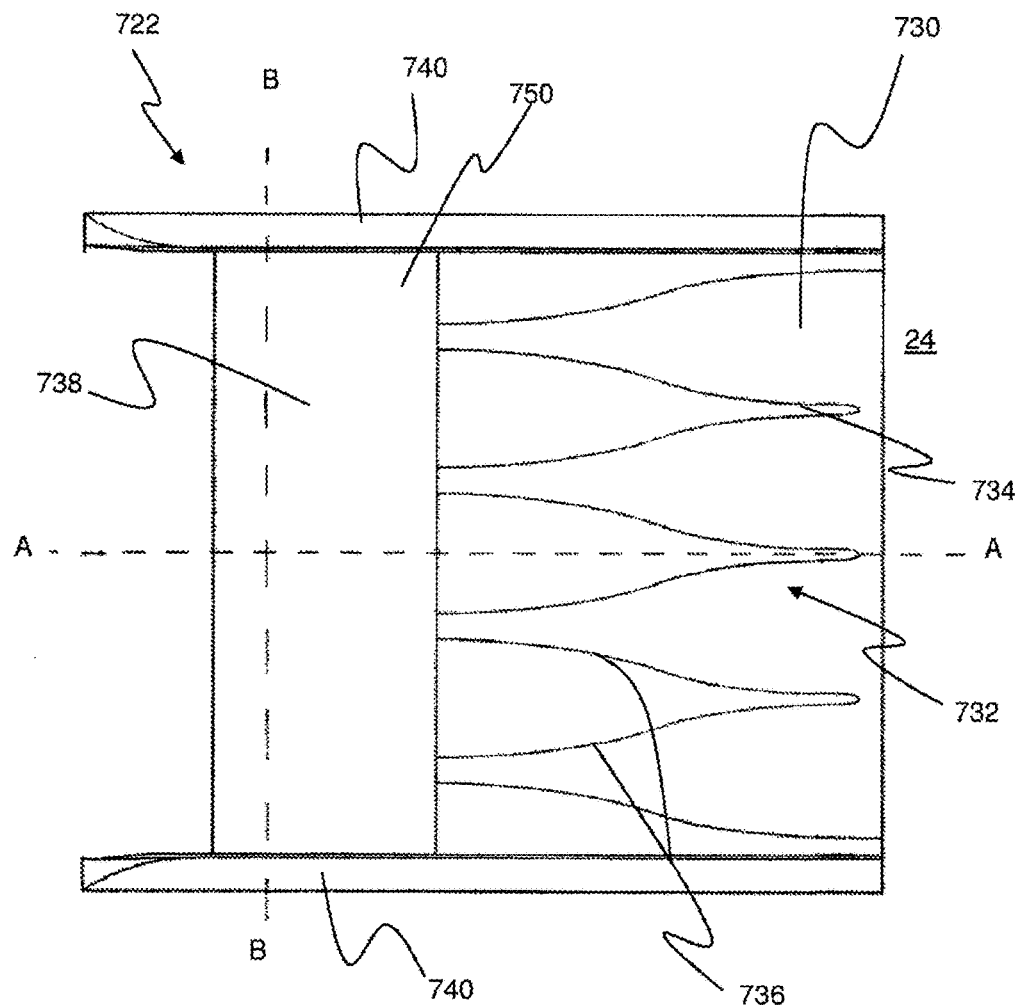
FIG. 10 shows a plan view of the aerodynamic unit of FIG. 9 isolated from the trailer of FIG. 1.

The aerodynamic unit 722 of FIG. 9 is similar to that shown in FIG. 8 in that it has a tapered section 729, a flow director 738, a planar section 750 and vortex generators 732. Additionally, the present embodiment includes two fins 740.

Figure 11:
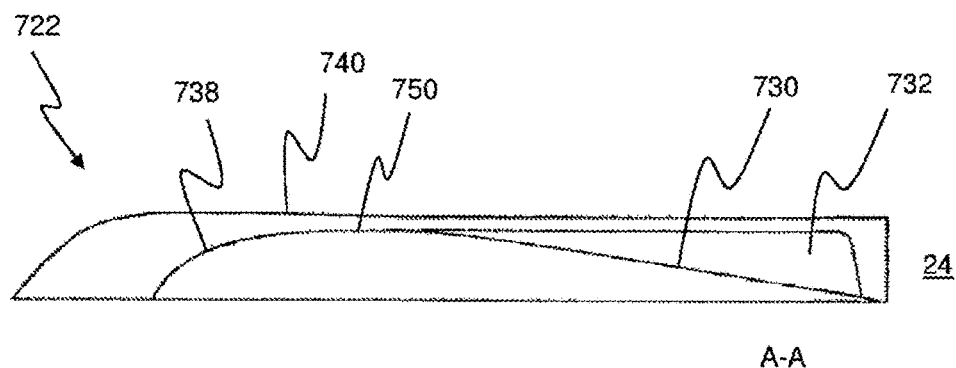
FIG. 11 shows a section view of the aerodynamic unit of FIG. 10 through a section A-A of FIG. 10.

The two fins 740 are provided on opposing sides of the aerodynamic unit and are positioned so as to be substantially aligned with the sides 18, 20 of the trailer unit 10. The fin 740 extend to a height above the highest point of the flow director 738 and vortex generators 732, such that an upper surface of the fins 740 is spaced from the upper surface of the vortex generator. Alternatively, the maximum height of the fins 740 and the vortex generators may be substantially equal. Referring in particular to FIG. 11, the vortex generator 732 is arranged to have a height such that an upper surface of each vortex generator 732 is parallel to a fin 740. Alternatively, an upper surface of each vortex generator 732 may be at an incline so as to be at an angle to a plane parallel to an upper surface of the fin 740, e.g. sloping downwards from towards the leading end to the trailing end.

Figure 12:
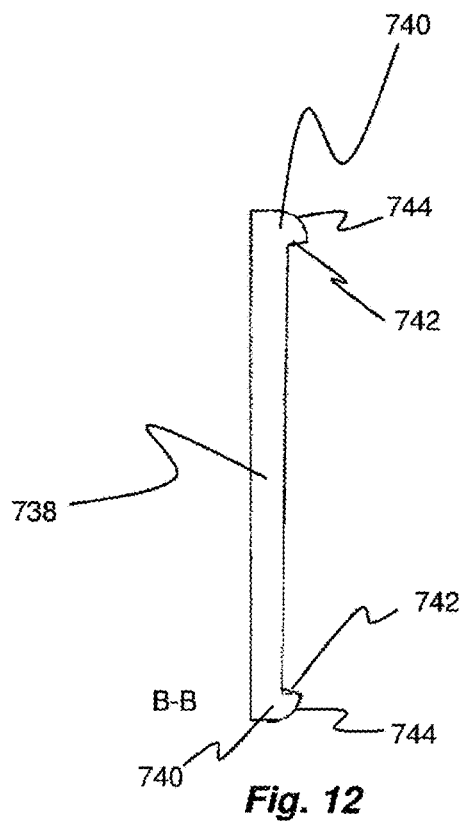
FIG. 12 shows a section view of the aerodynamic unit of FIG. 10 through a section B-B of FIG. 10.
Figure 13:
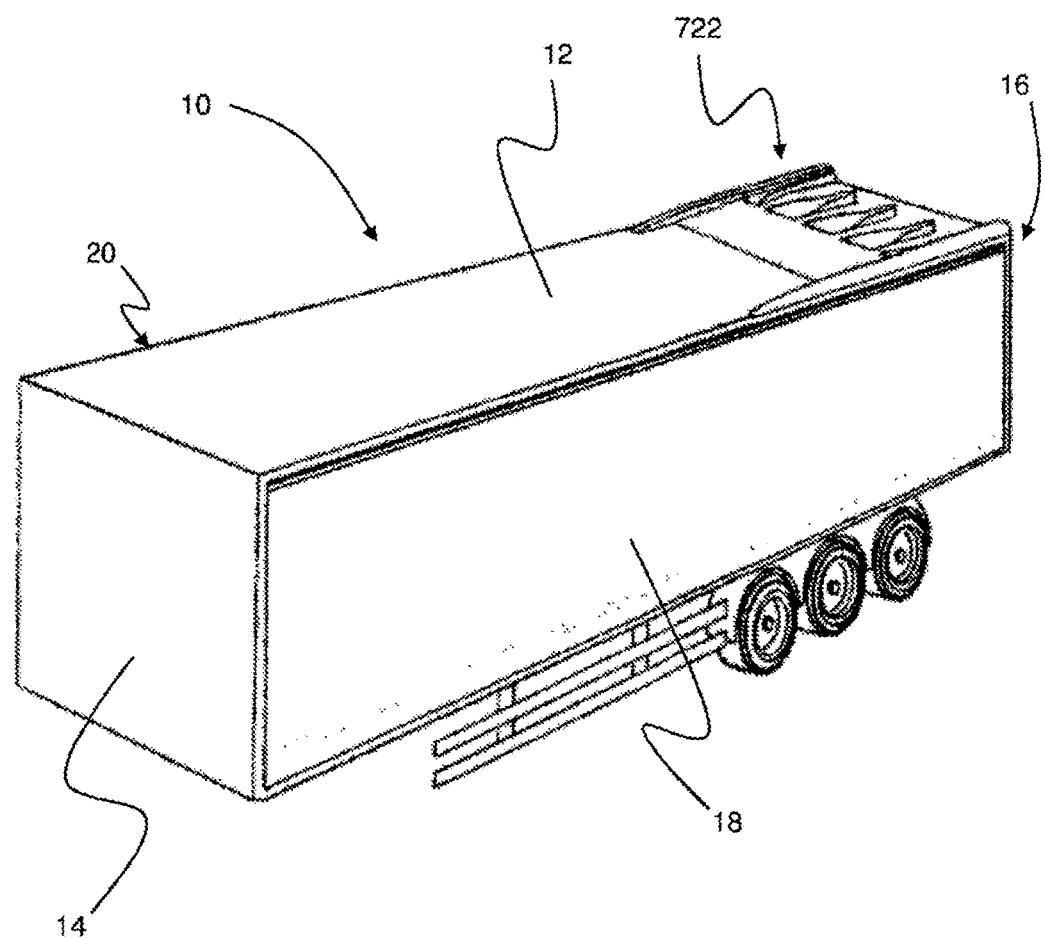
FIG. 13 shows a perspective view of a trailer having the aerodynamic unit of FIG. 10 attached thereto.

Referring in particular to FIG. 12, each fin 740 has a planar face 742 on a side of the fin 740 innermost the aerodynamic unit 722. Each fin also has a curved face 744 on a side of the fin outermost the aerodynamic unit 722. The curved face 744 is curved from a position substantially parallel to the respective side 18, 20 of the trailer unit 10 to a position that meets the planar face 742. In the present embodiment, the radius of the curve is approximately 125 mm, but in alternative embodiments the curve may be any other suitable radius or have a varying radius, for example 50 mm or greater. The curve of the face 744 reduces the effect of side winds by reducing turbulence that would otherwise disturb the flow of air over the aerodynamic unit. The transition between the face 744 and the face 742 is a step change.

The fins 740 extend the length of the tapered section and the flow director, and extend towards the front end 14 of the trailer 10 to an extent that the end of the side fins 740 is spaced from the flow director 738. An extension of the fins 740 beyond the flow director further ensures that, in use when the trailer is moving forward, air is directed to flow over the flow director, to further improve the aerodynamic efficiency of a vehicle.

In the present embodiment, five vortex generators 732 are provided. Three of the vortex generators are similar to the vortex generators shown in FIG. 8. The additional two vortex generators 733 are similar to a bi-sectored half of the other vortex generators. One of the additional vortex generators 733 is positioned adjacent and in abutment with one of the fins 740, and the other additional vortex generator 733 is positioned adjacent and in abutment with the other fin 740, such that the bi-sectored side is adjacent the fin 740.

In use, during forward travel of a vehicle to which the trailer unit 10 is attached, air flows over and along the roof 12. The air then flows towards the aerodynamic unit 722. The fins 740 direct the air flow towards the flow director 738. Air flow is then directed over the flow director 738. The construction of the fins and the flow director contributes to reducing drag and improving the aerodynamic efficiency of the vehicle.

The smooth transition from the flow director to the inclined surface 730, the curved profile of the flow director 738, and the incorporation of the planar section 750 further improves aerodynamic efficiency.

The inclined surface 730 of the leading end directs the air flow from the rear end of the trailer unit 10 at an angle which reduces turbulence when the air flow exits the vehicle, and therefore reduces drag. The vortex generators 732 generate vortices which promote substantial alignment of the air flow with the surface 730 when flowing over the tapered section and maintain this alignment when exiting the vehicle. The provision of the vortex generators 732 further reduces drag, and therefore improves fuel efficiency of a vehicle having the trailer 10 attached thereto.

Advantageously, the construction of the aerodynamic unit 722, in particular the flow director and in the present embodiment the flow director in combination with the fins 740, has been found to reduce the boundary layer compared to sloped inclined roof of trailer units of the prior art and therefore improve the fuel economy compared to vehicles of the prior art. This result is surprising because usually increasing the height of a trailer unit (i.e. by attachment of the aerodynamic unit thereto) would reduce aerodynamic efficiency, whereas the present embodiment increases the aerodynamic efficiency.

In use, the trailer may be connected to run with rake. That is, the front of the trailer may be higher from the ground than the rear of the trailer. The roof of the trailer may be angled or follow a curvature, for example in the case of a 'tear drop' shaped trailer. Where the roof is curved, the underside of the aerodynamic unit may follow a complimentary curvature.

Figure 14:
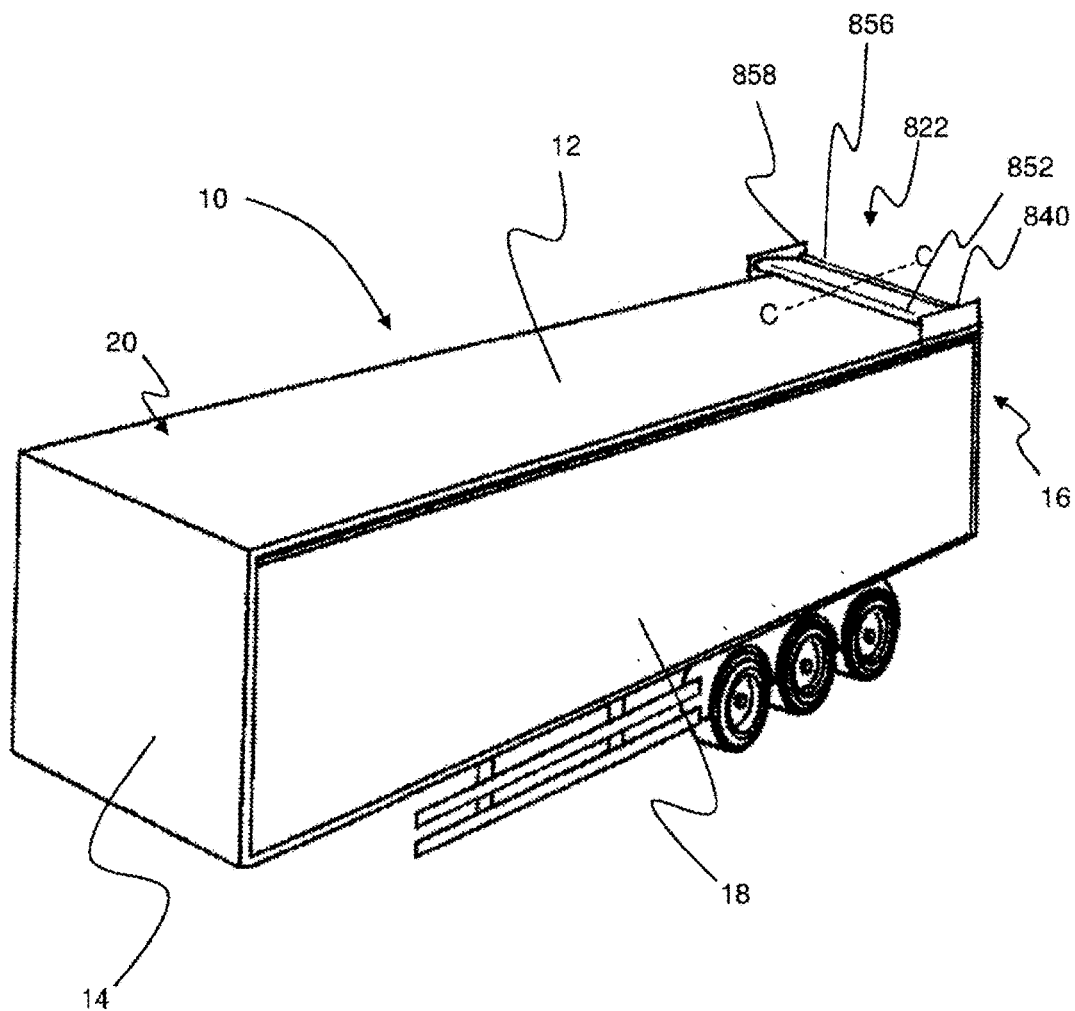
FIG. 14 shows a perspective view of the trailer of FIG. 1 with a further alternative aerodynamic unit attached thereto.
Figure 15:
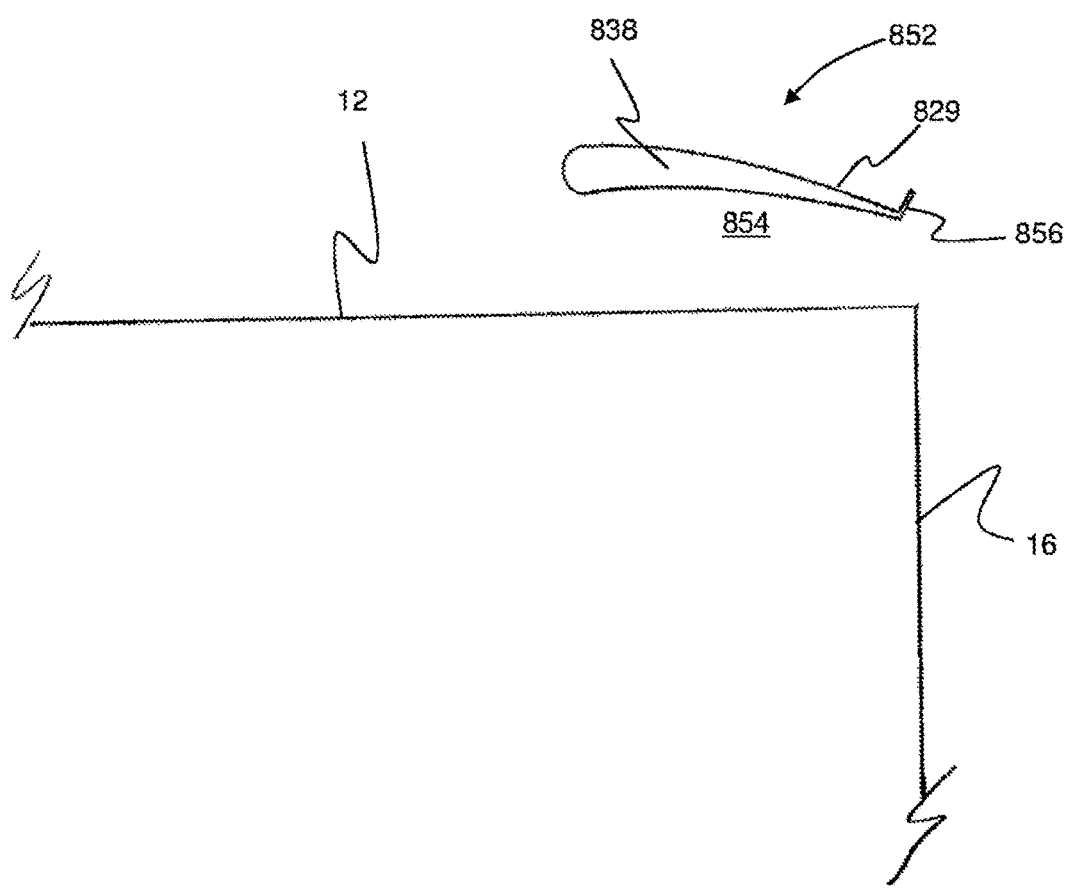
FIG. 15 shows a cross section of a rear portion of the trailer and aerodynamic unit of FIG. 14 through the section C-C of FIG. 14 without a side support in view.
Figure 16:
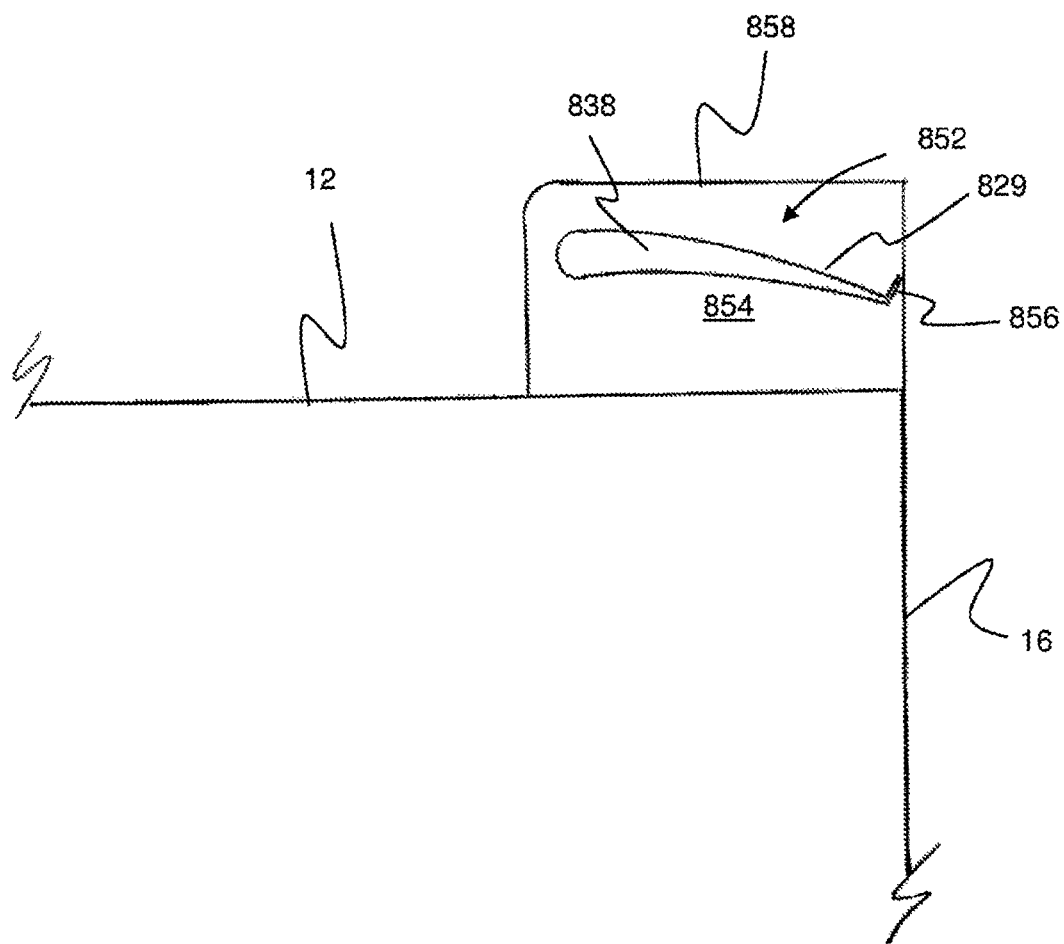
FIG. 16 shows a cross section of a rear portion of the trailer and aerodynamic unit of FIG. 14 through the section C-C of FIG. 14 with one side support in view.

A further alternative aerodynamic unit 822 is shown in FIGS. 14, 15 and 16. The aerodynamic unit 822 includes two supports 858 positioned in opposition on the roof 12 of the trailer 10, so that one support is substantially aligned with one of the sides 18 of the trailer 10 and the other support is substantially aligned with the other side 20 of the trailer 10. The supports 858 are of a fin construction (e.g. in use, the fins protrude upwardly from the roof of the trailer). The supports extend along the sides of the aerodynamic unit. In the present embodiment the sides of the supports have a substantially planar inner surface and outer surface that extends directly upwards from the roof 12 of the vehicle. However, in alternative embodiments the supports 858 may have a curved and a planar surface similar to that described for the fins 740 of the previously described embodiment.

An air flow guide 822 extends between the two supports 858. In the present embodiment, the air flow guide 822 is spaced from the roof 12 of the trailer 10 so as to form a gap 854 (shown in FIG. 15) between the roof and an underside of the air flow guide 822. In the present embodiment, the gap extends between the two supports 858 with no obstructions. In alternative embodiments, no gap may be provided between the air flow guide and the roof of the trailer. The gap 854 shown in FIG. 15 shows an exemplary case, but in many embodiments the gap between the roof of the trailer and the air flow guide will be smaller or larger than that shown in FIG. 15.

The air flow guide 822 can be considered to have a flow director 838 and a tapered portion 829, similar to that described in the previous embodiments.

In the present embodiment, the air flow guide has a curved underside and an curved upper surface and tapers from a leading end to a trailing end of the aerodynamic unit 822. A lip 856 having a planar profile, but in alternative embodiment having a curved profile, is positioned on a trailing edge of the portion of the air flow guide that can be considered the tapered portion 829. An end of the lip 856 at an end nearest the trailing end of the aerodynamic unit is positioned to be substantially aligned with the rear side 16 of the trailer 10 (i.e. the trailing end of the tapered portion is spaced towards the front of the trailer from the rear side of the trailer). In alternative embodiments the trailing end of the aerodynamic unit may be spaced in a forwardly direction from the rear of the trailer, or may overhang the trailer. However, it is preferable from a practical point of view with regard to damage limitation when parking at loading bays, that the aerodynamic unit does not overhang the trailer, and it is preferable from an aerodynamic efficiency point of view that there is substantially no space between the aerodynamic unit and the edge of the roof that is aligned with the rear side 16 of the trailer.

In use, the aerodynamic unit 852 has been found in improve the aerodynamic efficiency of a road vehicle and therefore improve fuel efficiency.

Figure 17A:
FIGS. 17A, 17B, 17C, 17D, 17E, and 17F show alternative air flow guide portions for an aerodynamic unit of the type shown in FIGS. 14 and 15.
Figure 17B:
Figure 17C:
Figure 17D:
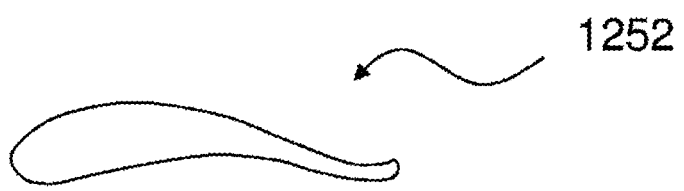
Figure 17E:
Figure 17F:

In alternative embodiments, the air flow guide 852 may have an alternative aerofoil shape. Example shapes are shown in FIGS. 17A, 17B, 17C, 17D, and 17E. Referring to FIG. 17A, air flow guide 952 has a curved upper surface and a planar underside. Referring to FIG. 17B, air flow guide 1052 has a similar shape to the air flow guide of FIG. 16A with an increased camber. Referring to FIG. 17C, air flow guide 1152 has a similar shape to air flow guide 852 but without a lip. Referring to FIG. 17D, air flow guide 1252 has a reflex trailing edge. Referring to FIG. 17E, air flow guide 1352 is a plate having a planar upper and lower surface. The plate may be angled to a roof of a vehicle or may be positioned substantially parallel to a roof of a vehicle. Referring to FIG. 17F, the air flow guide 1452 may a plate that is curved so as to have an upper surface substantially parallel to a lower surface, and the upper surface and lower surface are curved. In further alternative embodiments, vortex generators may be added to the tapered portion of the air flow guide.

Figure 18:
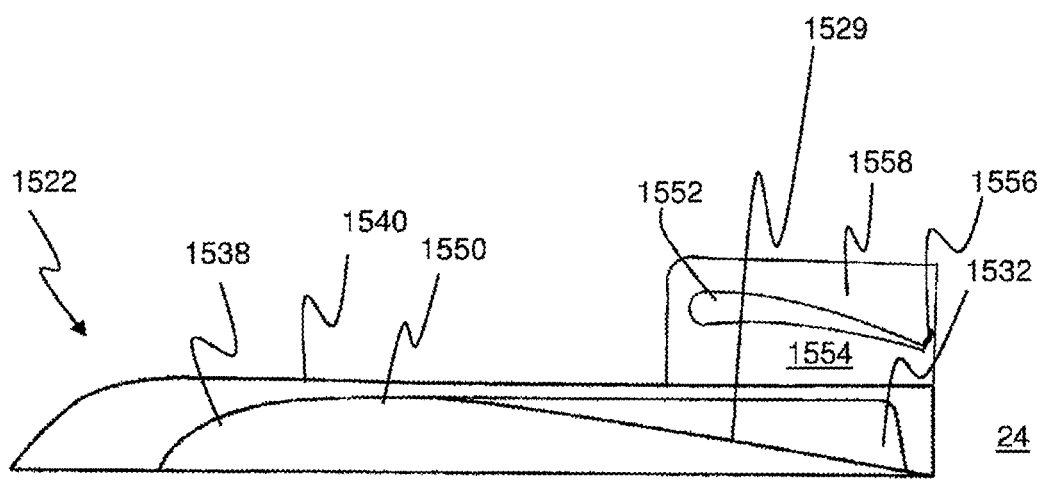
FIG. 18 shows a cross section of a yet further alternative aerodynamic unit.

A further alternative embodiment is shown in FIG. 18. The embodiment of FIG. 18 includes a combination of the features of the aerodynamic unit of FIGS. 8 to 13 and of the aerodynamic unit of FIGS. 14 to 16. Similar reference numerals are used for similar features with the prefix of "15", and only the main constructional differences are described again here.

The aerodynamic unit 1522 includes a fin 1540, tapered section 1529, a planar section 1550, a flow director 1538 and vortex generators 1532 similar to the embodiment of FIGS. 8 to 13. The aerodynamic unit further includes two supports 1558 positioned at a trailing end of the aerodynamic unit and an air flow guide 1552 extends between the two supports 1558. The air flow guide 1552 is positioned to be spaced from the upper surface of the tapered portion 1529 and the vortex generators 1532 so as to form a gap 1554 between the upper surface of the tapered portion 1529 and the upper surface of the vortex generators 1532.

The embodiment shown in FIG. 18 has been found to further improve the aerodynamic efficiency of the road vehicle and further reduce fuel costs.

Although the invention has been described above with reference to one or more preferred embodiments, it will be appreciated that various changes or modifications may be made without departing from the scope of the invention as defined in the appended claims.

For example, the aerodynamic unit has be described with reference to attachment to a trailer unit, but in alternative embodiments the aerodynamic unit may be attached to any other suitable road vehicle, in particular high sided road vehicles. Example vehicles include, rigid lorries, vans, buses and people carriers.

The invention claimed is:

1. An aerodynamic unit for a road vehicle, the aerodynamic unit comprising:
   a guide portion having an underside for positioning on, and being in direct contact with, a roof of a vehicle;
   a first or leading end for positioning distal to a rear end of a vehicle roof;
   a second or trailing end for positioning proximal to the rear end of the vehicle roof;
   a fin extending along each side of the aerodynamic unit in a direction between the trailing end and the leading end;
   wherein the guide portion decreases in height in a direction towards the trailing end of the unit; and
   wherein the aerodynamic unit is configured for attachment onto the vehicle roof of the road vehicle so that air passes over the aerodynamic unit during forward movement of the road vehicle.

2. The aerodynamic unit according to claim 1, wherein the guide portion defines a planar inclined surface.

3. The aerodynamic unit according to claim 1, comprising a planar section at or near the leading end, the planar section being dimensioned to have a height substantially equal to the height of the guide portion at an end of the guide portion nearest the leading end.

4. The aerodynamic unit according to claim 1, comprising a flow director at or near the leading end of the aerodynamic unit, for directing air flow to the guide portion, wherein the flow director is configured to have a height increasing in a direction from the leading end towards the trailing end.

5. The aerodynamic unit according to claim 4, wherein the flow director defines a convex curved surface for air to flow over, wherein the convex curved surface has a radius that increases from a minimum at an end furthest the trailing end to a maximum at an end nearest the trailing end.

6. The aerodynamic unit according to claim 4, wherein the flow director defines a planar inclined surface for air to flow over.

7. The aerodynamic unit according to claim 1, comprising one or more vortex generators protruding from the guide portion for creating vortices.

8. The aerodynamic unit according to claim 7, wherein each vortex generator has a substantially constant height profile, such that the vortex generators protrude more from the guide portion towards the trailing end than towards the leading end; or wherein an upper surface of the vortex generators is parallel with the underside of the unit and/or the roof of the vehicle; or wherein an upper surface of the vortex generators slopes downwards in the direction of the trailing end.

9. The aerodynamic unit according to claim 7, wherein each vortex generator comprises a neck positioned towards the trailing end and a wider region positioned towards the leading end arranged so as to be capable of, in use, producing two vortices.

10. The aerodynamic unit according to claim 9, wherein the wider region comprises side walls and either a solid region is defined between said side walls of the wider region or a hollow region is defined between said side walls of the wider region.

11. The aerodynamic unit according to claim 1, wherein the guide portion has first length (L) and the fins have a length of one of the group consisting of 1.25L, 1.5L, or 2L.

12. The aerodynamic unit according to claim 1, wherein the fins are configured to project substantially along the length of the vehicle roof.

13. The aerodynamic unit according to claim 1, wherein each fin comprises a planar face that faces inwardly towards a central region of the aerodynamic unit.

14. The aerodynamic unit according to claim 1, wherein each fin includes a curved surface that faces outwardly from the aerodynamic unit.

15. The aerodynamic unit according to claim 1, wherein the guide portion has a maximum height that extends a distance that is less than or equal to one fifth of a length of the guide portion.

16. The aerodynamic unit according to claim 1, wherein the aerodynamic unit comprises a unitary body.

17. A road vehicle having the aerodynamic unit according to claim 1.

18. A method of modifying a road vehicle to improve the road efficiency thereof, the method comprising:
attaching an aerodynamic unit according to claim 1 to a roof of the road vehicle in a region towards the rear of the road vehicle.

19. The aerodynamic unit according to claim 1, wherein the fins project forwardly of the guide portion and define a region for directing air flow between the fins before flowing over the guide portion.

* * * * *